United States Patent [19]

Hann

[11] Patent Number: 5,762,249

[45] Date of Patent: Jun. 9, 1998

[54] SADDLEBAG SUPPORT BARS AND MOUNTING PLATES

[76] Inventor: Eric S. Hann, 10508 S. Aspen Dr., Palos Hills, Ill. 60465

[21] Appl. No.: 747,265

[22] Filed: Nov. 12, 1996

[51] Int. Cl.⁶ .................. B62J 9/00; B62J 7/04
[52] U.S. Cl. ............ 224/430; 224/423; 224/413; 224/442
[58] Field of Search ............ 224/413, 429, 224/430, 423, 428; D12/406, 407, 408, 409

[56] References Cited

U.S. PATENT DOCUMENTS

| | | | |
|---|---|---|---|
| 2,109,315 | 2/1938 | Harley | 224/429 |
| 2,423,003 | 6/1947 | Buegeleisen | 224/423 |
| 2,553,739 | 5/1951 | Ashdowne | 224/430 |
| 2,577,560 | 12/1951 | Ashdowne | 224/430 |
| 2,783,927 | 3/1957 | Harley | 224/430 |
| 3,346,156 | 10/1967 | Jones | 224/413 |
| 3,795,354 | 3/1974 | Stippich | 224/430 |
| 3,934,770 | 1/1976 | Larsen | 224/429 |
| 4,260,084 | 4/1981 | Warren, Jr. | 224/430 |
| 5,649,657 | 7/1997 | Chuang | 224/430 |

FOREIGN PATENT DOCUMENTS

| | | | |
|---|---|---|---|
| 240613 | 10/1987 | European Pat. Off. | 224/32 A |
| 838572 | 3/1939 | France | 224/32 A |
| 2570342 | 3/1986 | France | 224/32 A |
| 346439 | 4/1931 | United Kingdom | 224/32 R |

Primary Examiner—Henry J. Recla
Assistant Examiner—Gregory M. Vidovich
Attorney, Agent, or Firm—Myers & Associates, Ltd

[57] ABSTRACT

Saddlebag support bars and mounting plates for supporting saddlebags on a motorcycle. The mounting plates are flat members with a first end having a reduced thickness to cooperate with the bracket of a motorcycle backrest. The mounting brackets include a pair of bolt-receiving mounting holes for mounting the support bars, one of which has a cut-out area on its underside to receive the head of a mounting plate attachment bolt. The support bar includes a modified U-shape projecting rearwardly and outwardly from a respective support bar.

6 Claims, 6 Drawing Sheets

SADDLEBAG SUPPORT BARS AND MOUNTING PLATES

BACKGROUND

1. Field of Invention

This invention provides a means for promoting the safe use of throw-over style saddlebags on HARLEY-DAVIDSON "Softail" models when an easily removed backrest is also used.

2. Description of Prior Art

For years people have enjoyed the fun involved with motorcycling. While motorcycling is fun, it is inherently difficult to carry personal belongings while participating. Years ago the throw-over bags that cowboys used to carry their personal possessions on their horse, called "saddlebags", started to be used to carry possessions for the motorcyclist. These saddlebags were made to be either relatively permanently mounted to the rear of a motorcycle and often made out of fiberglass or similar material, or the very popular "throw-over" style that is often made from leather and designed to allow the easy installation and removal by connecting the saddlebags with a flexible strap that would allow the saddlebags to hang over each side of the rear fender of a motorcycle and the strap would lay either on top of or underneath the motorcycle seat. While the throw-over style saddlebags allowed the motorcyclist an ease in removal, plus some storage, the saddlebags themselves must be protected from getting caught up in moving or flexing parts of a motorcycle such as the drive chain, rear sprocket, and/or the rear wheel. People started using metal saddlebag support bars that would often mount directly to the rear fender struts of a motorcycle to support these saddlebags outward and away from any moving or flexing parts, thus preventing the saddlebags from being damaged by a motorcycle, causing damage to a motorcycle, and/or an accident.

Additionally, motorcycling is often a sport that is enjoyed by both an operator and a passenger at the same time. Most motorcycles have a seat that is designed for both an operator and a passenger. For years numerous manufacturers have been producing backrests for the passengers, which have been mounted by bolting a backrest onto the rear fender struts of a motorcycle. These backrests can only be removed by physically unbolting four or more bolts, which is a time consuming task.

To achieve the "custom look", owners of HARLEY-DAVIDSON motorcycles commonly install a backrest for a passenger. These backrests come as either "permanent" or "easily removable". "Permanent" backrests can only be removed by physically unbolting four or more mounting bolts. "Easily removable" backrests are removable with little effort and often require no tools to remove the backrest. These easily removable backrests employ specialized mounting hardware that is uniquely shaped to allow the secure installation of the backrest. The problem is that this specialized mounting hardware has a unique size and shape which is necessary and the use of it prevents the installation of all currently existing saddlebag support bars. This is because its required size and/or shape does not allow for the direct installation of the saddlebag support bars. The end result is that without my saddlebag support bars and mounting plates an individual must choose between the use of an easily removable backrest or the ability to carry personal possessions with them by using throw-over saddlebags. An individual always has the option of attempting to bend and reshape the old style saddlebag support bars but then one must drill holes through the rear fender struts, rear fender, and any other part that happens to be in the way. My saddlebag support bars and mounting plates are a definite improvement over this more drastic option because my saddlebag support bars and saddlebag support bar mounting plates are direct bolt-ons using existing holes, which means no holes to drill, no reshaping, and no rechroming of the old style support bars. My saddlebag support bars and mounting plates can be easily removed and there would be no unsightly holes drilled into each side of the motorcycle fender struts and rear fender. My saddlebag support bars are uniquely shaped to enhance the "custom look" of a Harley-Davidson motorcycle by being shaped to following the lines of the upper portion of the rear wheel swingarm.

It is thus an object of my saddlebag support bars and mounting plates to provide an apparatus and method of allowing the use of both throw-over saddlebags and an easily removable backrest at the same time on a HARLEY-DAVIDSON motorcycle. My saddlebag support bars and mounting plates obviate the possibility that a person's saddlebags might get caught in any moving, rotating or flexing part of a motorcycle and causing damage to the saddlebags and/or an accident. The present invention also relates to mounting plates and saddlebag support bars for achieving the "custom look" at the rear fender struts of a HARLEY-DAVIDSON "Softail" motorcycle.

In accordance with this invention, the saddlebag support bar mounting plates are solid pieces of metal or metal-like material for attachment to the rear fender struts on a motorcycle. The mounting plates are attached by using existing fender strut mounting holes and common mounting hardware such as bolts. Additionally, my saddlebag support bars are solid pieces of metal or metal-like material that are uniquely designed to fit my saddlebag support bar mounting plates as a set, for each side of a motorcycle.

OBJECTS AND ADVANTAGES

Accordingly, several object advantages of the present invention are:

(a) to provide a safe method of allowing both the use of a removable backrest and throw-over style saddlebags on the rear of a HARLEY-DAVIDSON motorcycle;

(b) to provide such saddlebag support bar mounting plates which are readily attachable to the rear wheel fender struts of the motorcycle and requires no modification of the removable backrest or the rear wheel fender struts and allowing for the use of existing mounting holes rather than having to drill any new holes or modifying any existing holes on the fender struts and rear fender;

(c) to provide saddlebag support bars that are uniquely shaped to fit my saddlebag support bar mounting plates;

(d) to provide a means to use both an easily removable type backrest and throw-over style saddlebags while still keeping with the "lines" and "flow" of the motorcycle, thus retaining the custom look;

(e) to provide saddlebag support bar mounting plates that can be chrome plated or polished;

(f) to provide saddlebag support bars that can be chrome plated or polished.

Further objects and advantages will become apparent from consideration of the ensuing descriptions which are illustrated schematically in the accompanying drawings.

DRAWING FIGURES

In the drawings, closely related figures have the same number but different alphabetic suffixes. Various other objects, advantages, and features of the invention will become apparent to those skilled in the art from the following discussion taken in conjunction with the following drawings in which:

1. FIG. 1a is a side elevation of the right side saddlebag support bar mounting plate;

2. FIG. 1b is a top elevation of the right side saddlebag support bar mounting plate;

3. FIG. 1c is a side elevation of the right side saddlebag support bar mounting plate;

4. FIG. 1d is a cross-section taken along line 1d—1d in figure 1c of a cut-out area of the right side saddlebag support bar mounting plate;

5. FIG. 2a is a side elevation of the left side saddlebag support bar mounting plate;

6. FIG. 2b is a top elevation of the left side saddlebag support bar mounting plate;

7. FIG. 2c is a side elevation of the left side saddlebag support bar mounting plate;

8. FIG. 2d is a cross-section taken along line 2d—2d in FIG. 2c of a cut-out area of the left side saddlebag support bar mounting plate;

9. FIG. 3a is a side elevation of the right side saddlebag support bar;

10. FIG. 3b is a perspective view of the right side saddlebag support bar;

11. FIG. 4 is a cross-section taken along the line 4—4 in FIG. 3a of the right side saddlebag support bar;

12. FIG. 5a is a side elevation of the left side saddlebag support bar;

13. FIG. 5b is a perspective view of the left side saddlebag support bar;

14. FIG. 6 is a cross-section taken along the line 6—6 in FIG. 5a of the left side saddlebag support bar;

15. FIG. 7 is a top elevation of a motorcycle rear fender with fender struts, saddlebag support bar mounting plates, saddlebag support bars, and saddlebags in accordance with this invention; and 16. FIG. 8 is a side elevation of the rear wheel of a motorcycle provided with an easy-off type backrest, saddlebag support bar, and saddlebag support bar mounting plate in accordance with this invention.

17. FIG. 9 is a cross-hatch view of the shape of an upper swingarm of known design of a HARLEY-DAVIDSON "Softail" motorcycle.

18. FIG. 10 is a cross-hatch view of the shape of a lower swingarm of known design of a HARLEY-DAVIDSON "Softail" motorcycle.

SUMMARY OF INVENTION

The present saddlebag support bars and mounting plates accomplish the above-stated objectives, as well as others, as may be determined by a fair reading and interpretation of the entire specification. This invention relates to both a saddlebag support bar and a mounting plate for each rear fender strut of a HARLEY DAVIDSON motorcycle.

To achieve the "custom look", owners of HARLEY DAVIDSON motorcycles commonly employ a passenger backrest of some sort and saddlebags that are often made of leather that are connected together with a strap of some sort. These saddlebags are often called "throw-over" style. These saddlebags are used to contain, transport and protect personal items from the elements, and are supported by metal bars (saddlebag support bars) that support the saddlebags outward, thus drastically reducing the possibility that the saddlebags might get caught in any moving, flexing or rotating portion of the rear of a motorcycle. If this did occur the saddlebags and its contents could be damaged and/or an accident could result.

In accordance with this invention, the mounting plates attach directly over the outwardly facing side of the fender struts. These mounting plates are attached to the fender struts by making use of the existing rear fender mounting hardware and existing mounting hardware holes. These mounting plates also have a cut-out area on the underside that allows the use of a mounting mechanism such as a bolt that is used to attach the rearward end of my saddlebag support bar. The farthest forward mounting plate hole also is used to attach the forward most end of my saddlebag support bar. The farthest rearward saddlebag support bar mounting plate hole is attached to the rear fender strut by part of the easily removable backrest mounting device.

A principle objective of this invention is to provide a novel mounting mechanism that allows the use of both an easily removable backrest and throw-over style saddlebags—allowing both comfort to a passenger and the safe use of throw-over style saddlebags on a motorcycle. My invention of the saddlebag support bar mounting plates and accompanying uniquely designed saddlebag support bars are necessary because of the recent invention of the easily removable type backrest. In the past, my invention was not necessary because individuals never had the option of using a backrest that can be removed easily and saddlebag support bars were able to share the mounting hardware of permanent style backrests. The individual would have had to completely unbolt the entire backrest from the rear of a motorcycle—a true inconvenience to say the least—if the individual wanted to maintain the "lines" and the "custom look" of a motorcycle and if he had no passenger and therefore no need for the backrest. In the ever increasing motorcycling crowd, the backrest is looked upon as an extremely unappealing but often necessary evil of the sport and the customizing of motorcycles is a very serious and highly competitive sport from which a large number of companies and the respective employees make their livelihood. As a result, the need for the invention of the easily removable type backrest and the resulting need for my uniquely designed saddlebag support bars and mounting plates will be welcome additions to motorcycling.

Another objective of this invention is to provide such a mounting mechanism which is readily attachable to the rear fender struts of the motorcycle and requires no modification of the rear wheel fender or rear wheel fender struts of the motorcycle. This is necessary because easily removable backrests employ specialized mounting hardware that is uniquely shaped to allow the secure installation of the backrest. The problem is that this specialized mounting hardware has a unique size and shape which is necessary and the use of it prevents the installation of all other saddlebag support bars. This is because its required size and/or shape does not allow for the installation of the rear end of all the current saddlebag support bars. The end result is that without my saddlebag support bars and mounting plates an individual must choose between the use of an easily removable backrest or the ability to carry personal possessions with them by using saddlebags. An individual always has the option of drilling holes through the rear fender struts, rear fender, frame, and any other part that happens to be in the way and then mounting the current design of saddlebag support bars in a different location. By doing this though, one would jeopardize the effectiveness of the saddlebag support bars from keeping throw-over style saddlebags from getting caught up in any moving, flexing or rotating portion of the rear of a motorcycle—the original design intent of saddlebag support bars.

My saddlebag support bars and mounting plates are a definite improvement over this more drastic option because my combination saddlebag support bar mounting plates and uniquely designed saddlebag support bars easily mount using existing holes which means no holes to drill, and my invention can be removed and there would be no unsightly holes drilled into each side of the motorcycle fender struts and rear fender.

Further objectives and advantages of this invention will be apparent from the following detailed description of a presently preferred embodiment which is illustrated schematically in the accompanying drawings.

DETAILED DESCRIPTION OF THE PREFERRED EMBODIMENT

As required, detailed embodiments of the present invention are disclosed herein: However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Reference is now made to the drawings, wherein like characteristics and features of the present invention shown in the various FIGURES are designated by the same reference numerals.

A typical embodiment of a saddlebag support bar mounting plate 2a (right side) is illustrated in FIG. 1a (top view), FIG. 1b (side view), and FIG. 1c (bottom view). Holes 29 and 33 (FIGS. 1a and 1c), and 30 FIGS. 1a, 1c, and 1d) are sufficient in size to accept mounting bolts of known design 83, 81, and 79 (FIG. 7) respectively. Surface 20 (FIGS. 1b, 1c, 1d and 7) is the underside surface of the right side saddlebag support bar mounting plate and when properly mounted on a motorcycle, is in contact with fender strut 67 (FIG. 7). Surface 21 (FIGS. 1a, 1b, 1c, and 7) is perpendicular to surface 20 (FIGS. 1b, 1c, 1d, and 7). Surface 22 (FIGS. 1a, 1b, and 7) is parallel to surface 20 (FIGS. 1b, 1c, 1d, and 7) and allows for a thickness of material identified by the existence of surface 21 which is best exemplified in FIG. 1b. Surface 23 (FIGS. 1a, 1b, and 7) is perpendicular to surface 22 (FIGS. 1a, 1b, and 7) and allows for the remaining thickness of said saddlebag support bar mounting plate. Surface 24 (FIGS. 1a, 1b, 1d, and 7) runs parallel to both surface 20 (FIGS. 1b, 1c, 1d, and 7) and surface 22 (FIGS. 1a, 1b, and 7) and serves as the outer surface to the right side saddlebag support bar mounting plate when properly mounted on a motorcycle. Surface 25 (FIGS. 1a and 1b) is angled downward towards surface 26 (FIGS. 1a, 1b, and 1c). Surface 26 is perpendicular to surface 20 (FIGS. 1b, 1c, 1d, and 7). Surface 27 (FIGS. 1a, 1b, 1c, and 1d) is the bottom surface to the right side saddlebag support bar mounting plate when such plate is properly mounted on a motorcycle. Surface 28 (FIGS. 1a, 1c, 1d, and 7) serves as the top surface to the right side saddlebag support bar mounting plate when such plate is properly mounted on a motorcycle. Surface 31 (FIGS. 1c and 1d) is the bottom surface to an area cut-out from the right side saddlebag support bar mounting plate in sufficient shape, size and depth as to allow the head of mounting bolt 81 (FIG. 7) to lay within said cut-out area while also allowing said bolt head of mounting bolt 81 (FIG. 7) to lay flush with surface 20 (FIGS. 1b, 1c, 1d, and 7) when the threaded portion of said mounting bolt is placed through hole 30 (FIGS. 1a, 1c and 1d) allowing for the unobstructed mounting of the right side saddlebag support bar mounting plate to motorcycle fender strut. Surface 32 (FIGS. 1c and 1d) is perpendicular to surface 31 (FIGS. 1c and 1d) and identifies a typical size and shape of the cut-out area on the right side saddlebag support bar mounting plate that is designed for the acceptance of the head of mounting bolt 81 (FIG. 7) to rest inside of said cut-out area.

FIG. 1d shows a cross-hatch view of the cut-out area on the right side saddlebag support bar mounting plate 2a. Surface 32 (FIGS. 1c and 1d) has a predetermined shape as to allow for the head of bolt 81 (FIG. 7) to lay within this cut-out area while also preventing bolt 81 (FIG. 7) from rotating when being tightened down. This cut-out area also is designed so that hole 30 allows for the threaded portion of bolt 81 (FIG. 7) to pass through while surface 31 (FIGS. 1c and 1d) prevents the head of the bolt 81 (FIG. 7) from passing through.

A typical embodiment of a saddlebag support bar mounting plate (left side) is illustrated in FIG. 2a (top view), FIG. 2b (side view), and FIG. 2c (bottom view). Holes 43 and 44 (FIGS. 2a and 2c), and 47 (FIGS. 2a, 2c and 2d) are sufficient in size to accept mounting bolts of known design 75, 73, and 71 (FIG. 7) respectively. Surface 34 (FIGS. 2b, 2c, 2d, and 7) is the underside surface of the left side saddlebag support bar mounting plate and when properly mounted on a motorcycle, is in contact with rear fender strut 68 (FIGS. 7, and 8). Surface 35 (FIGS. 2a, 2b, 2c, and 7) is perpendicular to surface 34 (FIGS. 2b, 2c, 2d, and 7). Surface 36 (FIGS. 2a and 2b) is parallel to surface 34 (FIGS. 2b, 2c, 2d, and 7) and allows for a thickness of material identified by the existence of surface 35 which is best exemplified in FIG. 2b. Surface 37 (FIGS. 2a, 2b, and 7) is perpendicular to surface 36 (FIGS. 2a and 2b) and allows for the remaining thickness of said saddlebag support bar mounting plate. Surface 38 (FIGS. 2a, 2b, 2d, and 7) runs parallel to both surface 34 (FIGS. 2b, 2c, 2d, and 7) and surface 36 (FIGS. 2a and 2b) and serves as the outer surface to the left side saddlebag support bar mounting plate when properly mounted on a motorcycle. Surface 39 (FIGS. 2a, 2b, and 8) is angled downward to surface 40 (FIGS. 2a, 2b, 2c, and 8). Surface 40 is perpendicular to surface 34 (FIGS. 2b, 2c, 2d, and 7). Surface 41 (FIGS. 2a, 2b, 2c, 2d, and 8) is the bottom surface to the left side saddlebag support bar mounting plate when such plate is properly mounted on a motorcycle. Surface 42 (FIGS. 2a, 2c, 2d, 7 and 8) serves as the top surface to the left side saddlebag support bar mounting plate when such plate is properly mounted on a motorcycle. Surface 45 (FIGS. 2c and 2d) is the bottom surface to an area cut-out from the left side saddlebag support bar mounting plate in sufficient shape, size and depth as to allow the head of mounting bolt 73 (FIG. 7) to lay within said cut-out area while also allowing said bolt head of mounting bolt 73 (FIG. 7) to lay flush with surface 34 (FIGS. 2b, 2c, 2d, and 7) when the threaded portion of said mounting bolt is placed through hole 44 (FIGS. 2a, 2c and 2d) allowing for the unobstructed mounting of the left side saddlebag support bar mounting plate to motorcycle fender strut 68 (FIGS. 7 and 8). Surface 46 (FIGS. 2c and 2d) is perpendicular to surface 45 (FIGS. 2c and 2d) and identifies a typical size and shape of the cut-out area on the left side saddlebag support bar mounting plate that is designed for the acceptance of the head of mounting bolt 73 (FIG. 7) to rest inside said cut-out area (FIG. 2d).

FIG. 2d shows a cross-hatch view of the cut-out area on the left side saddlebag support bar mounting plate 2b. Surface 46 (FIGS. 2c and 2d) has a predetermined shape as to allow for the head of bolt 73 (FIG. 7) to lay within this cut-out area while also preventing bolt 73 (FIG. 7) from rotating when being tightened down. This cut-out area also is designed so that hole 44 allows for the threaded portion of bolt 73 (FIG. 7) to pass through while surface 45 (FIGS. 2c and 2d) prevents the head of the bolt 73 (FIG. 7) from passing through.

FIGS. 3a and 3b shows the right side saddlebag support bar 48 of my invention. Surface 48a (FIGS. 3a, 3b, and 7) identifies the outer edge surface of the rearward mounting system of said saddlebag support bar 48 of sufficient size and thickness while resembling a tube which is sized as to allow the threaded portion of bolt 81 (FIG. 7) to pass through and with nut 82 (FIG. 7) is firmly mounted to fender strut 67 (FIG. 7). Surface 49 (FIGS. 3a, 3b, and 7) is the portion of this right-side saddlebag support bar's rearward mounting system that comes in contact with nut 82 (FIG. 7) when properly installed on a motorcycle. Surface 55 (FIGS. 3b and 7) is the surface of this right-side saddlebag support bar rearward mounting system that comes in contact with surface 24 when properly installed on a motorcycle. Hole 50 (FIG. 3a) is of sufficient size as to allow the threaded portion of bolt 81 (FIG. 7) to pass through said rearward mounting system for proper installation on a motorcycle. Surface 51 (FIGS. 3a, 3b, and 7) identifies the outer edge surface of the forward mounting system of said saddlebag support bar of sufficient size and thickness while resembling a tube which is sized as to allow the threaded portion of bolt 79 (FIG. 7) to pass through and with nut 80 (FIG. 7) is firmly mounted to fender strut 67 (FIG. 7). Surface 52 (FIGS. 3a, 3b, and 7) is the portion of this right-side saddlebag support bar's forward mounting system that comes in contact with nut 80 (FIG. 7) when properly installed on a motorcycle. Surface 56 (FIGS. 3b and 7) is the surface of this right-side saddlebag support bar 48 forward mounting system that comes in contact with surface 24 when properly installed on a motorcycle. Hole 53 (FIG. 3a) is of sufficient size as to allow the threaded portion of bolt 79 (FIG. 7) to pass through said forward mounting system for proper installation on a motorcycle.

FIG. 4 shows a cross-hatch view of the general shape of the portion of the right-side saddlebag support bar 48 that is designed to accomplish the actual saddlebag supporting (surface 54 FIGS. 3a, 3b, 4, and 7) after proper installation is complete and throw-over style saddlebags are used. As seen in FIGS. 3a, 3b, 4, 7 and 8, right-side saddlebag support bar 48 is in the form of a solid, modified U-shaped bar having lower horizontal portion 48b and projecting angularly rearward and outward from two free ends 48' mounted on said saddlebag support bar mounting plate 2a (right side) and is spaced from moving parts of the motorcycle upon which it is mounted.

FIGS. 5a and 5b shows the left-side saddlebag support bar 60 of my invention. Surface 57 (FIGS. 5a, 5b, and 7) identifies the outer edge surface of the rearward mounting system of sufficient size and thickness while resembling a tube which is sized as to allow the threaded portion of bolt 73 (FIG. 7) to pass through and with nut 74 (FIGS. 7 and 8) is firmly mounted to fender strut 68 (FIGS. 7 and 8). Surface 58 (FIGS. 5a, 5b, and 7) is the surface of this left-side saddlebag support bar's rearward mounting system that comes in contact with nut 74 (FIGS. 7 and 8) when properly installed on a motorcycle. Surface 64 (FIGS. 5b and 7) is the surface of this left-side saddlebag support bar rearward mounting system that comes in contact with surface 38 when properly installed on a motorcycle. Hole 59 (FIG. 5a) is of sufficient size as to allow the threaded portion of bolt 73 (FIG. 7) to pass through said rearward mounting system for proper installation on a motorcycle. Surface 60a (FIGS. 5a, 5b, and 7) identifies the outer edge surface of the forward mounting system of this left-side saddlebag support bar of sufficient size and thickness while resembling a tube which is sized as to allow the threaded portion of bolt 71 (FIG. 7) to pass through and with nut 72 (FIGS. 7 and 8) is firmly mounted to fender strut 68 (FIGS. 7 and 8). Surface 61 (FIGS. 5a, 5b, and 7) is the portion of this left-side saddlebag support bar's forward mounting system that comes in contact with nut 72 (FIGS. 7 and 8) when properly installed on a motorcycle. Surface 65 (FIGS. 5b and 7) is the surface of this left-side saddlebag support bar forward mounting system that comes in contact with surface 38 when properly installed on a motorcycle. Hole 62 (FIG. 5a) is of sufficient size as to allow the threaded portion of bolt 71 (FIG. 7) to pass through said forward mounting system for proper installation on a motorcycle.

FIG. 6 shows a cross-hatch view of the general shape of the portion of the left-side saddlebag support bar that is designed to accomplish the actual saddlebag supporting (surface 63 FIGS. 5a, 5b, 6, 7, and 8) after proper installation is complete and throw-over style saddlebags are used. As seen in FIGS. 5a, 5b, 7 and 8, left side saddlebag support bar 60 is in the form of a solid, modified U-shaped bar having lower horizontal portion 60b and projecting angularly rearward and outward from two free ends 60' mounted on the saddlebag bar mounting plate 2b (left side) and is spaced from moving parts of the motorcycle upon which it is mounted.

FIG. 7 shows the rear fender 66 of a HARLEY-DAVIDSON "Softail" motorcycle of known design which attaches to rear fender struts 67 and 68 through the use of bolts 79, 83, 85, 71, 75, and 77, and nuts 80, 84, 86, 72, 76, and 78 respectively. FIG. 7 also shows rear turn signals 69 and 70 of a HARLEY-DAVIDSON "Softail" motorcycle of known design. In accordance with the present invention, the forward portion of the right-side saddlebag support bar mounting plate 2a is properly attached to rear wheel fender strut 67 through the use of bolt 79 which passes through hole 33 (FIGS. 1a and 1c) and hole 53 (FIG. 3a) of the right-side saddlebag support bar 48 before being tightened down by nut 80. A similar mounting arrangement for the mounting of the forward portion of the left-side saddlebag support bar mounting plate is accomplished by bolt 71 which passes through hole 47 (FIGS. 2a and 2c) of the left-side saddlebag support bar mounting plate 2b and through hole 62 (FIG. 5a) before being tightened down by nut 72. Additionally, bolt 81 passes though hole 30 (FIGS. 1a, 1c, and 1d) of the right-side saddlebag support bar mounting plate and hole 50 (FIG. 3a) of the right-side saddlebag support bar 60 before being tightened down by nut 82. The head of bolt 81 fits into the cut-out area on the right-side saddlebag support bar mounting plate and rests against surface 31 (FIGS. 1c and 1d) as to prevent the entire bolt 81 from passing through said saddlebag support bar mounting plate, while said head of bolt 81 also rests against surface 32 (FIGS. 1c and 1d) which is designed in this invention as to not allow the head of bolt 81 to turn when being tightened down with nut 82 (FIGS. 7 and 8). This alleviates the need for a hole to be drilled through rear fender 66 (FIGS. 7 and 8) and fender strut 67 (FIG. 7). Additionally, a similar arrangement is designed for the left-side of this motorcycle where bolt 73 passes through hole 44 (FIGS. 2a, 2c, and 2d) of the left-side saddlebag support bar mounting plate and hole 59 (FIG. 5a) of the left-side saddlebag support bar before being tightened down by nut 74 (FIGS. 7 and 8). The head of bolt 73 fits into the cut-out area of the left-side saddlebag support bar mounting plate and rests against surface 45 (FIGS. 2c and 2d) as to prevent the entire bolt 73 from passing through said saddlebag support bar mounting plate, while said head of bolt 73 also rests against surface 46 (FIGS. 2c and 2d) which is designed in this invention as to not allow the head of bolt 73 to turn when being tightened down with nut 74 (FIGS. 7 and 8). Likewise, this also alleviates the need for a hole to be drilled through rear fender 66 (FIGS. 7 and 8) and fender strut 68 (FIGS. 7 and 8). Additionally, bolt 83 passes through hole 29 (FIGS. 1a and 1c) of the right-side saddlebag support bar mounting plate before being tightened down by nut 84 when properly installed and bolt 75 passes through hole 43 (FIGS. 2a and 2c) of the left-side saddlebag support bar mounting plate before being tightened down by nut 76 when properly installed on a motorcycle. Additionally, bolt 85 and nut 86 are part of the right-side of the rear fender mounting system for a HARLEY-DAVIDSON "Softail" motorcycle of known design and a similar bolt 77 and nut 78 are part of the left-side of the rear fender mounting system for a HARLEY-DAVIDSON "Softail" motorcycle of known design. Additionally, throw-over style saddlebags are attached to eachother through connecting strap.

FIG. 8 shows the rear wheel 88, rear fender 66, left-side rear fender strut 68, left-side rear turn signal 69, and seat 93, of a HARLEY-DAVIDSON "Softail" motorcycle of known design with associated rear tire 87. Upper and lower swingarms 89 and 90 carry a frame/axle horn which includes a rear wheel axle 95 and axle nut 94 of known design. Additionally, FIG. 8 shows a easily removable style passenger backrest 91 and associated backrest mounting side plate 92 that can be installed on a HARLEY-DAVIDSON "Softail" motorcycle. FIG. 8 also shows the left-side saddlebag support bar 63 installed with nuts 72 and 74 onto the invention's left-side saddlebag support bar mounting plate with surfaces 38, 39, 40, 41, and 42 visible. As seen in FIG. 8, the end portion 92a of backrest mounting side plate overlays the reduced thickness at surface 22, bolt 75 and nut 76 of left side saddlebag support plate 2a and the surface 36, bolt 83 and nut 84 of right side saddlebag support plate 2b (not shown) to enable the saddlebag support bars and mounting plates to be used with the backrests of a motorcycle, such as present in a HARLEY-DAVIDSON "Softail" model. The backrest mounting side plates include brackets (not shown) on its underside which engage respectively a portion of bolts 75, 83.

Figures 1A, 1B, 1C:
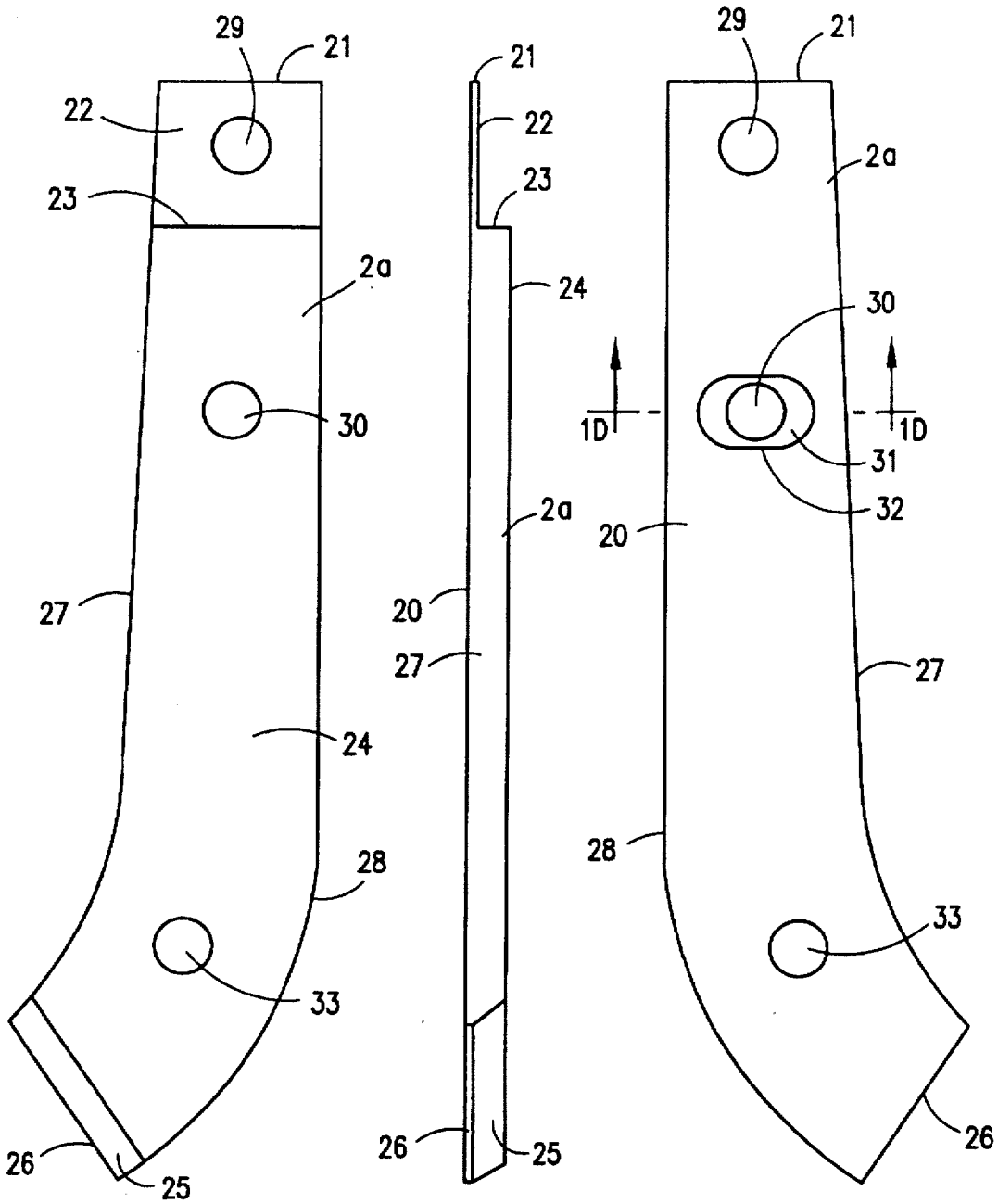
Figure 1D:
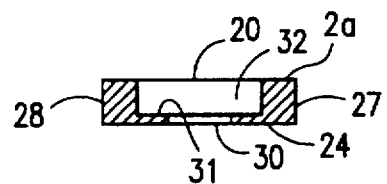
Figure 2A:
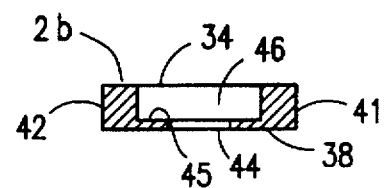
Figure 2B:
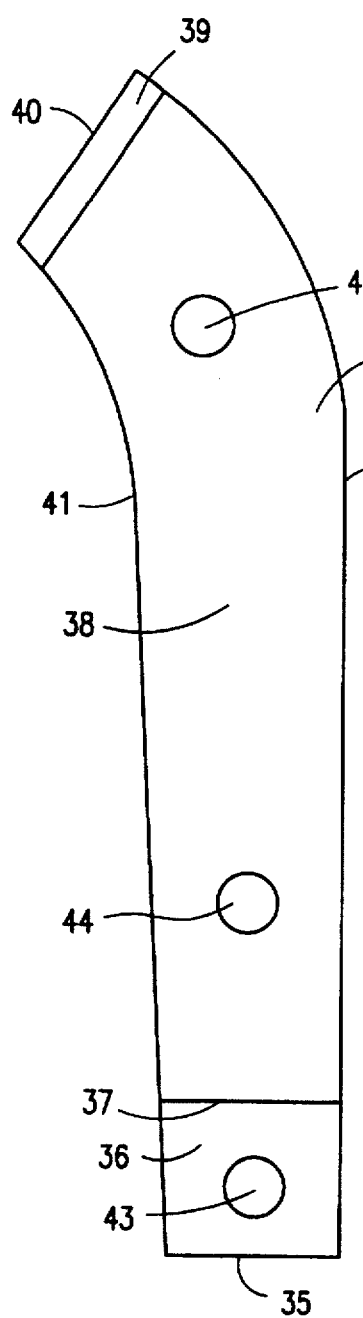
Figure 2C:
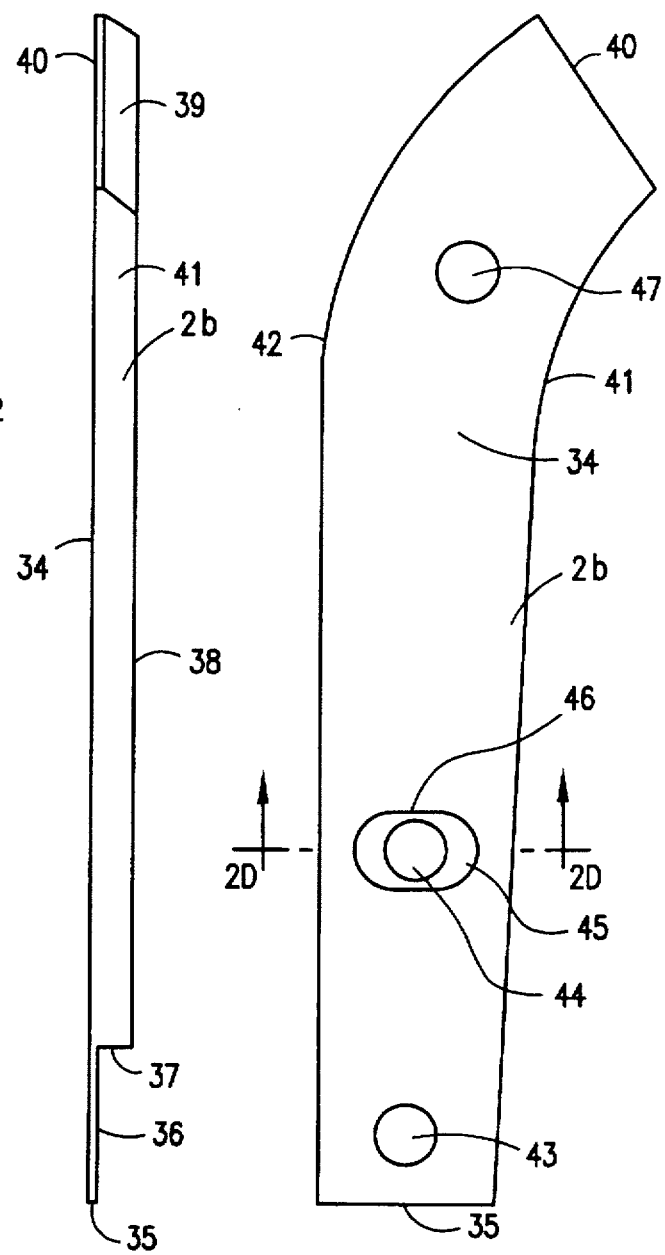
Figure 3A:
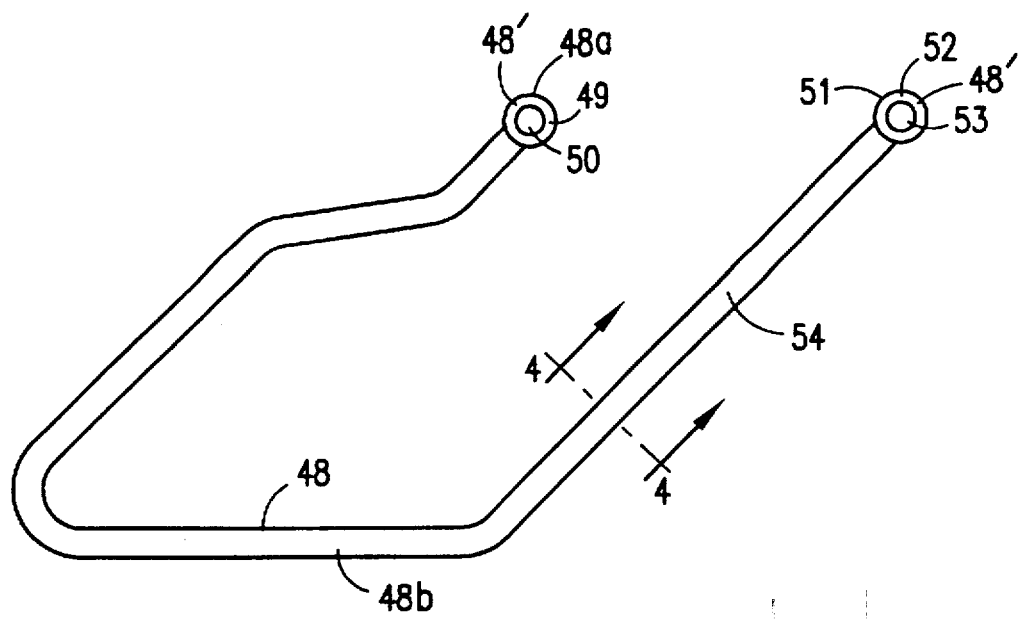
Figure 3B:
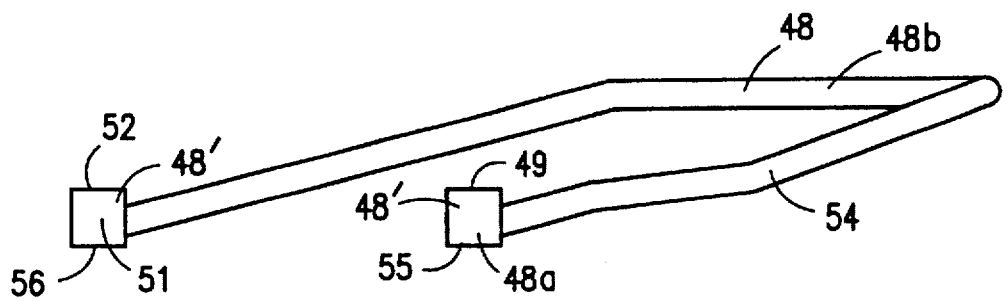
Figure 4:
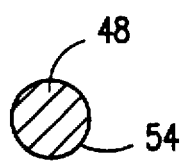
Figure 5A:
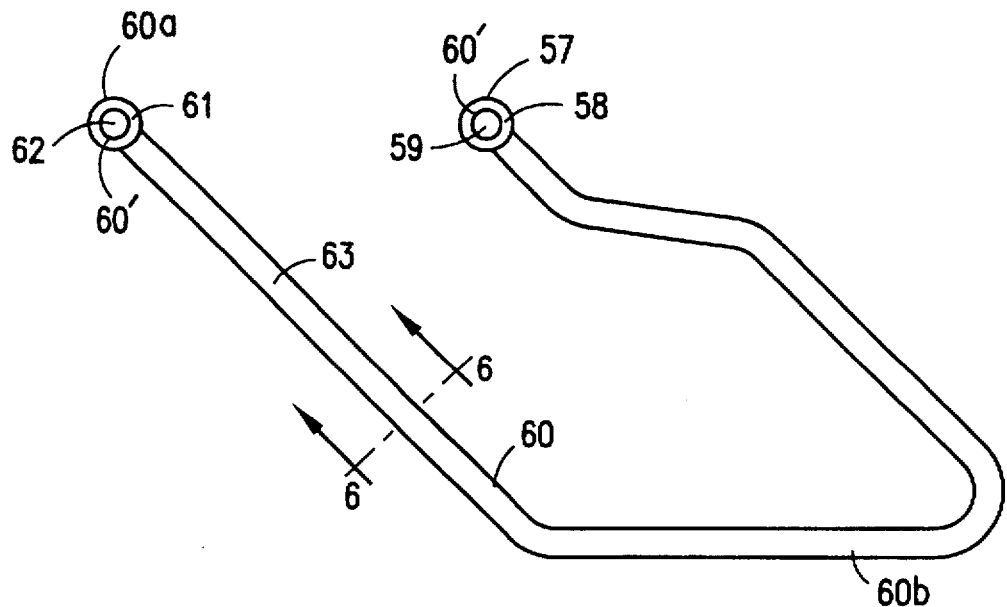
Figure 5B:
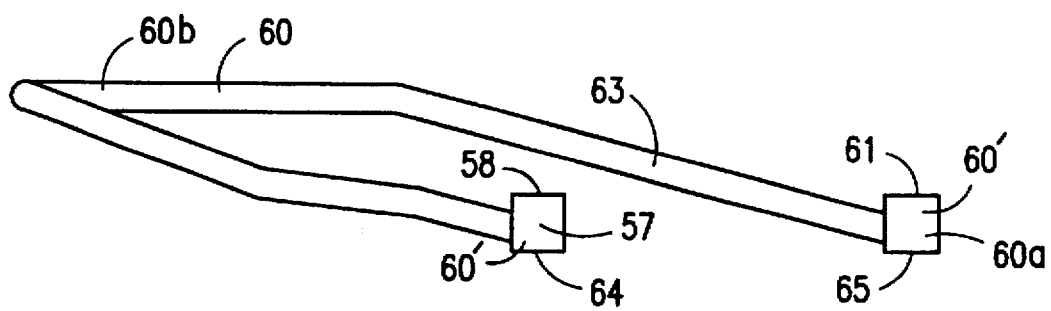
Figure 6:
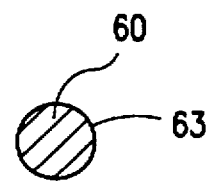
Figure 7:
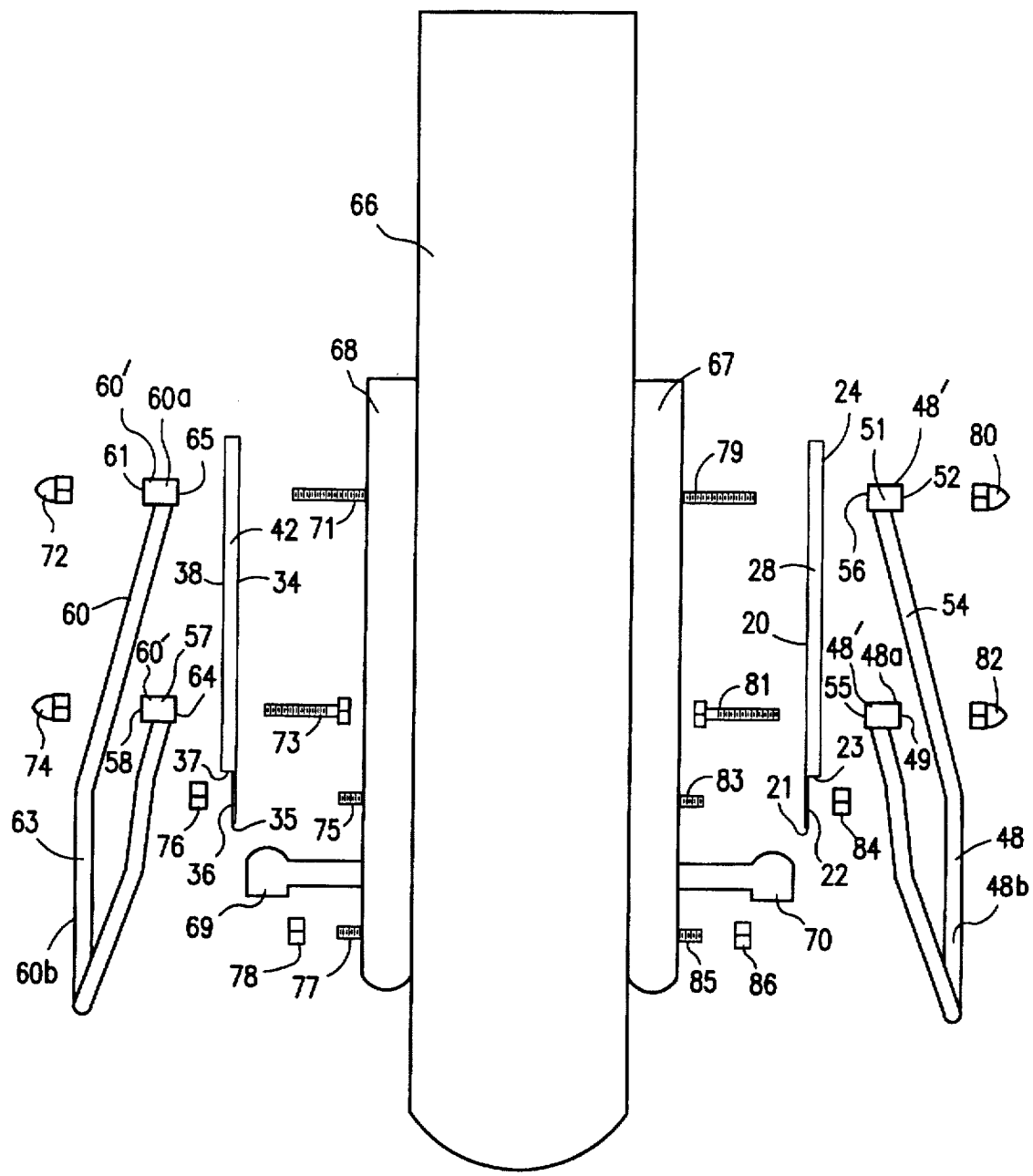
Figures 8, 9, 10:
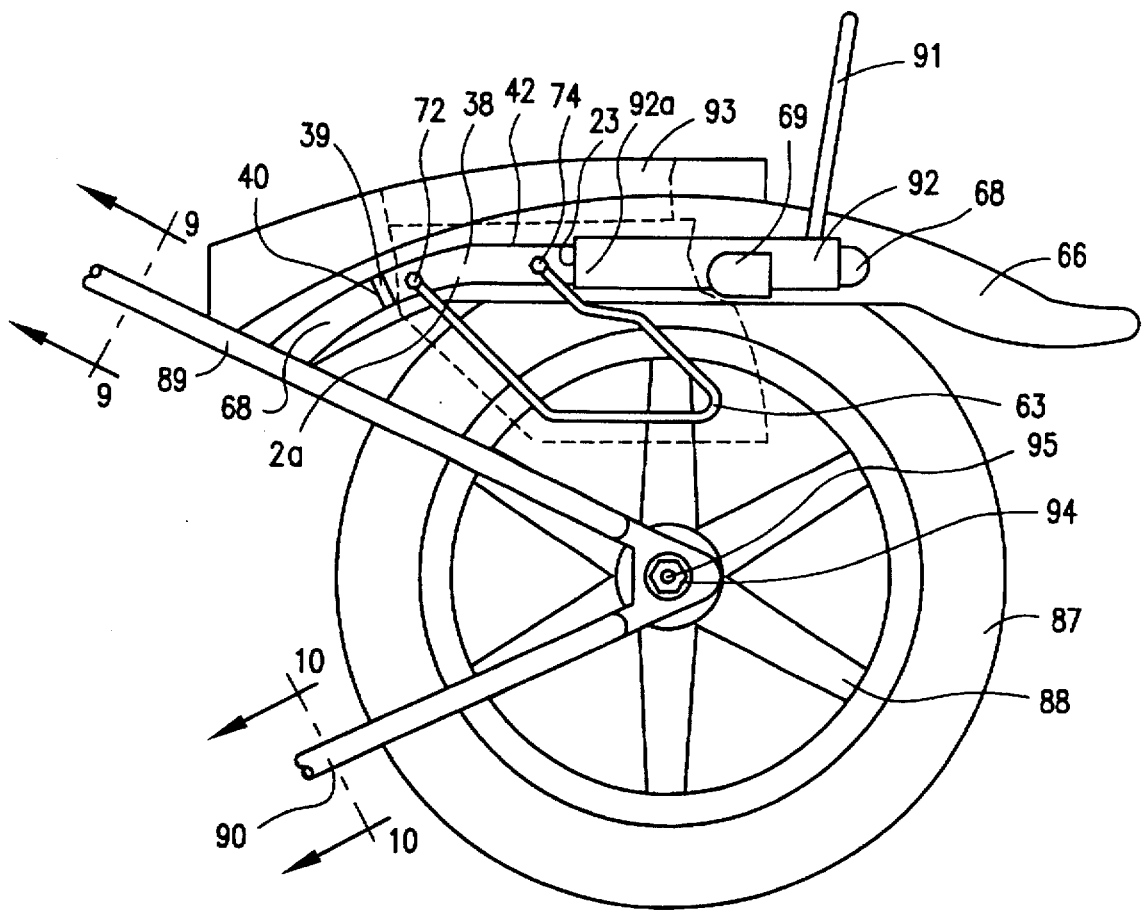
FIG. 9 shows a cross-hatch view of the shape of the upper swingarm 89 of known design of a HARLEY-DAVIDSON "Softail" motorcycle.
FIG. 10 shows a cross-hatch view of the shape of the lower swingarm 90 of known design of a HARLEY-DAVIDSON "Softail" motorcycle.

The saddlebag support bar mounting plates fit directly onto the outward surface of a rear fender struts on a HARLEY-DAVIDSON "Softail" motorcycle and are to be combined with my uniquely shaped saddlebag support bars. The saddlebags support bar mounting plates have a cut-out area that allows for the head of a bolt to fit snugly without allowing the head to turn. This cut-out area has a hole which allows the threaded portion of the bolt to pass through. This bolt would act as the rear clamping/mounting bolt for my saddlebag support bars. Each of the saddlebag support bar mounting plates make use of two existing fender strut bolt holes and is bolted directly to the fender strut at these two holes which does not require the defacing of the fender and fender struts by drilling holes into them.

For HARLEY-DAVIDSON models other than the "Softail" model and all other beneficial applications on other vehicles, the shapes and dimensions of the saddlebags support bar mounting plates and corresponding saddlebag support bars may be modified, as necessary, to provide a proper fit.

CONCLUSION, RAMIFICATIONS AND SCOPE

Accordingly, the reader will see the continued need for a method of mounting saddlebag support bars now that the increasingly popular removable type backrests are being used, since the use of such backrests inherently require unique mounting bolts. These different mounting bolts do not allow for the use of all current saddlebag support bars and thus require the individual to choose between the need for a passenger backrest for comfort or for the use of saddlebags to carry possessions, but not both at the same time. My saddlebag support bars and mounting plates allows the best of both worlds by allowing the use of a backrest and the safe use of throw-over style saddlebags at the same time.

Although the preferred embodiment of the inventive saddlebag support bar mounting plates and corresponding uniquely designed saddlebag support bars is adapted to fit a motorcycle, it can find application on other vehicles as well. These vehicles include beach buggies and other off-road vehicles, and virtually any vehicle where a backrest and saddlebag are beneficial. The invention can be used even when the operator of the vehicle does not make use of an easily removable backrest or when a more permanently mounted backrest is used. Additionally, the saddlebag support bars and mounting plates can be modified to allow the installation of more permanent type saddlebags, used whether or not a backrest of some sort is used.

Although the description above contains many specificities, these should not be construed as limiting the scope of the invention but as merely providing illustrations of some of the presently preferred embodiments of this invention. The scope of the invention is not intended to be, nor should it be deemed to be, limited thereby and such other modifications or embodiments as may be suggested by the teachings herein are particularly reserved especially as they fall within the breadth and scope of the claims here listed. The scope of the invention should be determined by the appended claims and their legal equivalents, rather than by the examples given. For example, the forward most end of each saddlebag support bar mounting plate can be cut at many different angles, have a shortened surface, and/or no curved surface at all. Also, the saddlebag support bars can have a slightly different shape. It is possible that the construction of these mounting plates and corresponding saddlebag support bars lend themselves to many other uses which are not herein illustrated or suggested and it will become obvious that this construction is capable of modifications without departing from the spirit of the invention. I accordingly do not limit myself thereto except as hereinafter claimed.

I claim as my invention:

1. A saddlebag support assembly for attachment to the rear of a motorcycle assembly, comprising:
   support bar means having a pair of plates adapted for attachment to the fender of a motorcycle, and
   a pair of saddle support bars respectively being attached to an associated one of said plates, each said saddle support bar having a modified U-shape extending respectively downward from said associated plate, each said bar having a pair of free ends, each said plate having a plurality of mounting holes for receiving a plurality of bolt assemblies wherein one of the bolt assemblies attach said plate to the rear fender of the motorcycle and one of said free ends of an associated saddle support bar to said plate and another of the bolt assemblies attach the other of said free ends of said associated saddle support bar to said plate.

2. The saddlebag support assembly according to claim 1 wherein said pair of saddlebag support bars extend rearwardly from said pair of plates.

3. The saddlebag support assembly according to claim 2 wherein said pair of saddlebag bars extend outward from said pair of plates.

4. The saddlebag support assembly of claim 1 wherein each said plate having a rear end portion and a front end portion, at least one of said rear end portions having a reduced thickness with respect to said front end portion of an associated one of said plates.

5. The saddlebag support bar assembly according to claim 4 wherein one of said mounting holes on each of said plates is positioned on said rear end portion thereof.

6. The saddlebag support bar assembly according to claim 5 wherein one of said holes on each said plate includes an enlarged opening on a surface of said plate confronting the fender of the motorcycle.

* * * * *